United States Patent
Takanaka et al.

(10) Patent No.: US 9,690,992 B2
(45) Date of Patent: Jun. 27, 2017

(54) IMAGE PROCESSING APPARATUS, IMAGE PROCESSING METHOD, MOVING IMAGE PUBLISHING SYSTEM, MOVING IMAGE PUBLISHING METHOD, AND RECORDING MEDIUM

(71) Applicant: FUJIFILM Corporation, Tokyo (JP)

(72) Inventors: Hidetoshi Takanaka, Tokyo (JP); Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/801,861

(22) Filed: Jul. 17, 2015

(65) Prior Publication Data
US 2016/0034763 A1 Feb. 4, 2016

(30) Foreign Application Priority Data
Jul. 31, 2014 (JP) .................................. 2014-157074

(51) Int. Cl.
*H04N 9/80* (2006.01)
*G06K 9/00* (2006.01)
(Continued)

(52) U.S. Cl.
CPC ..... *G06K 9/00751* (2013.01); *G06K 9/00288* (2013.01); *G06K 9/00664* (2013.01); *G06K 9/00765* (2013.01); *G11B 27/034* (2013.01); *G11B 27/105* (2013.01); *G11B 27/28* (2013.01); *H04N 21/23418* (2013.01); *H04N 21/2743* (2013.01); *H04N 21/41407* (2013.01);
(Continued)

(58) Field of Classification Search
CPC .................................................. G06K 9/00751

USPC .......................................................... 386/241
See application file for complete search history.

(56) References Cited

U.S. PATENT DOCUMENTS 8,300,899 B2 10/2012 Masuda
9,325,691 B2 4/2016 Yahata et al.
(Continued)

FOREIGN PATENT DOCUMENTS

JP 2006-024060 1/2006
JP 2008-005167 1/2008
(Continued)

OTHER PUBLICATIONS

Japanese Official Action—2014-157074—Oct. 18, 2016.

*Primary Examiner* — Hung Dang
*Assistant Examiner* — Girumsew Wendmagegn
(74) *Attorney, Agent, or Firm* — Young & Thompson

(57) ABSTRACT

A plurality of frame images are extracted from a moving image, and image analysis is performed to determine a scene of each frame image. The plurality of frame images are divided into divided frame image groups according to a replay order of the moving image while taking one frame image different from the scenes of preceding and following frame images in the replay order of the moving image, or two or more frame images, in which the same scene is consecutive, as a divided frame image group. It is determined whether or not to publish each divided frame image group based on the priority of publishing, and frame images included in the divided frame image group determined to be published are combined to generate the digest moving image of the moving image. The digest moving image is uploaded to a server through a network.

22 Claims, 8 Drawing Sheets

(51) Int. Cl.
*G11B 27/034* (2006.01)
*G11B 27/10* (2006.01)
*G11B 27/28* (2006.01)
*H04N 21/234* (2011.01)
*H04N 21/2743* (2011.01)
*H04N 21/414* (2011.01)
*H04N 21/4223* (2011.01)
*H04N 21/845* (2011.01)
*H04N 21/8549* (2011.01)

(52) U.S. Cl.
CPC ..... *H04N 21/4223* (2013.01); *H04N 21/8456* (2013.01); *H04N 21/8549* (2013.01)

(56) References Cited

U.S. PATENT DOCUMENTS

| | | | | |
|---|---|---|---|---|
| 2012/0293687 | A1* | 11/2012 | Karn | H04N 5/23219 |
| | | | | 348/231.99 |
| 2013/0243273 | A1* | 9/2013 | Yamaji | G06K 9/00228 |
| | | | | 382/118 |
| 2014/0133764 | A1* | 5/2014 | Hong | G06F 17/30244 |
| | | | | 382/224 |

FOREIGN PATENT DOCUMENTS

| | | |
|---|---|---|
| JP | 2008-197837 | 8/2008 |
| JP | 2009-033738 | 2/2009 |
| JP | 2010-122733 | 6/2010 |
| JP | 2012-129961 | 7/2012 |
| JP | 2013-191035 | 9/2013 |
| JP | 2013-239797 | 11/2013 |
| WO | 2014/050092 | 4/2014 |

* cited by examiner

FIG. 5A
| IMAGE QUALITY EVALUATION ITEM | PRIORITY OF PUBLISHING |
|---|---|
| BLURRING/SHIFT | ○ HIGH   ○ MIDDLE   ○ LOW |
| BRIGHTNESS | ○ HIGH   ○ MIDDLE   ○ LOW |
FIG. 5B
APPEARING PERSON  PRIORITY OF PUBLISHING
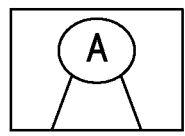  ○ HIGH   ○ MIDDLE   ○ LOW
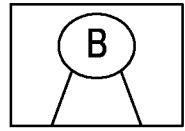  ○ HIGH   ○ MIDDLE   ○ LOW
FIG. 5C
| SCENE OF ANNOTATION | PRIORITY OF PUBLISHING |
|---|---|
| LIMB | ○ HIGH   ○ MIDDLE   ○ LOW |
| ELECTRIC TRAIN | ○ HIGH   ○ MIDDLE   ○ LOW |
FIG. 6
MOVING IMAGE 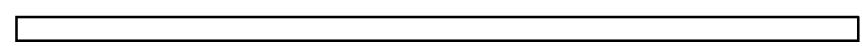
FRAME IMAGE  · · · · · · · · · · · · · · · · · · · · 

IMAGE PROCESSING APPARATUS, IMAGE PROCESSING METHOD, MOVING IMAGE PUBLISHING SYSTEM, MOVING IMAGE PUBLISHING METHOD, AND RECORDING MEDIUM

CROSS-REFERENCE TO RELATED APPLICATIONS

The present application claims priority under 35 U.S.C. §119 to Japanese Patent Application No. 2014-157074, filed Jul. 31, 2014, all of which are hereby expressly incorporated by reference into the present application.

BACKGROUND OF THE INVENTION

1. Field of the Invention

The present invention relates to an image processing apparatus, an image processing method, a moving image publishing system, a moving image publishing method, and a non-transitory computer-readable recording medium having a program recorded thereon which generate a digest moving image from a moving image, and upload the generated digest moving image to a server to publish the digest moving image to a user of a client.

2. Description of the Related Art

With the spread of mobile terminals, such as smartphones, and wearable terminals, and an increasing number of social network service (SNS) users, generally, the opportunity for a user to photograph a moving image has increased, and the photographed moving image is managed and shared on a cloud. On the other hand, the opportunity to photograph a still image or a moving image using a smartphone with high portability has increased, and the opportunity to photograph a still image or a moving image which includes personal information and is not desired to be published to other people has also increased. It is more difficult to determine the presence or absence of personal information, which is not desired to be published to other people, using a moving image compared to a still image, and in case where a frame or scene which is only a part of a moving image but is not desired to be published to other companies is included, a user needs to segment a moving image and perform scene division. For this reason, an enormous amount of labor is required for the edition of the moving image.

In contrast, for example, JP2013-191035A describes an image publishing apparatus which executes a plurality of kinds of image analysis processing for each image and determines publishing or non-publishing of each image based on the result of each kind of image analysis processing.

JP2013-239797A describes an image processing apparatus which extracts a portion corresponding to a recording date and time of a still image from a moving image using brightness, noise, and contrast of the moving image, face information conforming to an input person's still image, sound information, a zoom operation, or the like to generate a digest moving image.

However, in JP2013-191035A, there is a problem in that it is not possible to execute processing on a moving image.

In JP2013-239797A, there is a problem in that it is not possible to determine a scene of a still image or a moving image not desired by the user and to perform determination of publishing or non-publishing.

SUMMARY OF THE INVENTION

An object of the invention is to solve the problems in the related art, and is to provide an image processing apparatus and an image processing method capable of extracting a portion desired to be published by a user from a moving image to generate a digest moving image, a moving image publishing system and a moving image publishing method capable of uploading the generated digest moving image to a server and publishing the digest moving image to a user of a client, and a computer-readable recording medium having a program recorded thereon.

In order to achieve the object, invention provides an image processing apparatus including: a frame image extraction unit which extracts a plurality of frame images from a moving image; an image analysis unit which performs image analysis of each frame image to determine a scene of each frame image; a frame image division unit which divides the plurality of frame images into one or more divided frame image groups according to a replay order of the moving image while taking one frame image different from the scenes of preceding and following frame images in the replay order of the moving image, or two or more frame images, in which the same scene is consecutive, as a divided frame image group based on the scene of each frame image; a publishing/non-publishing determination unit which determines whether or not to publish each divided frame image group based on the priority of publishing for a scene of the divided frame image group; and a digest moving image generation unit which combines a part or all of frame images included in the divided frame image group determined to be published to generate a digest moving image of the moving image.

It is preferable that the image processing apparatus further includes a publishing range setting unit which sets a range of users to be published for each of one or more category scenes, wherein the publishing/non-publishing determination unit determines whether or not to publish each divided frame image group based on the priority of publishing for the scene of the divided frame image group for each type of the range of users to be published, and the digest moving image generation unit combines a part or all of frame images included in the divided frame image group determined to be published for each type of the range of users to be published and assigns access authority corresponding to the type of the range of users to be published to generate a digest moving image of each type of the range of users to be published.

It is preferable that the image processing apparatus further includes a priority setting unit which sets the priority of publishing for each of one or more category scenes.

It is preferable that in the image processing apparatus, the priority setting unit sets the priority of publishing for each image quality evaluation item, the image analysis unit performs image analysis of each frame image with regard to each image quality evaluation item to calculate an evaluation value of each frame image, and the publishing/non-publishing determination unit determines whether or not to publish each frame image based on a result of comparing the evaluation value of each frame image with a first publishing threshold value set according to the priority of publishing for each image quality evaluation item.

It is preferable that in the image processing apparatus, in case where the priority of publishing for each image quality evaluation item is higher, the first publishing threshold value is set to be smaller.

It is preferable that in the image processing apparatus, the priority setting unit sets the priority of publishing for each appearing person, the image analysis unit performs image analysis of each frame image to detect the presence or absence of a face and extracts a face image from each frame image in which it is detected that the face is present and which is a person scene, the image processing apparatus further includes a person determination unit which performs central person determination of the face image extracted from each frame image to determine a rank of each person appearing in the moving image, the frame image division unit divides frame images with a different number of appearing persons into different divided frame image groups, and in case where the divided frame image group is a person scene, the publishing/non-publishing determination unit determines whether or not to publish the divided frame image group based on a result of comparing a first overall evaluation value, which is obtained by adding a first weighting coefficient determined from the priority of publishing of the appearing person corresponding to a person appearing in the divided frame image group and a second weighting coefficient determined from the rank of the person corresponding to the person appearing in the divided frame image group, to an evaluation value of the divided frame image group calculated from the evaluation value of each frame image, with a second publishing threshold value set according to the priority of publishing for each appearing person.

It is preferable that in the image processing apparatus, in case where the priority of publishing for each appearing person is higher, the second publishing threshold value is set to be smaller.

It is preferable that in the image processing apparatus, the priority setting unit sets the priority of publishing for each appearing person, the image analysis unit performs image analysis of each frame image to detect the presence or absence of a face and extracts a face image from each frame image in which it is detected that the face is present and which is a person scene, the image processing apparatus further includes a person determination unit which performs person determination of the face image extracted from each frame image, the frame image division unit divides frame images with a different number of appearing persons into different divided frame image groups, in case where the divided frame image group is a person scene, the publishing/non-publishing determination unit temporarily determines whether or not to publish the divided frame image group based on the priority of publishing of the appearing person corresponding to the person appearing in the divided frame image group, the image processing apparatus further includes a display unit which displays a result of the temporary determination; and an input unit which receives final determination of publishing or non-publishing input by the user with reference to the result of the temporary determination displayed on the display unit and the publishing/non-publishing determination unit mainly determines whether or not to publish the divided frame image group based on the final determination.

It is preferable that in the image processing apparatus, the priority setting unit sets the priority of publishing for an annotation tag scene, the image analysis unit performs image analysis of each frame image to calculate the evaluation value of each frame image, analyzes the annotation tag scene of each frame image by annotation analysis, and assigns an annotation tag corresponding to the analyzed scene to the frame image, and in case where the divided frame image group is an annotation tag scene, the publishing/non-publishing determination unit determines whether or not to publish the divided frame image group based on a result of comparing a second overall evaluation value, which is obtained by adding a third weighting coefficient determined from the priority of publishing for the annotation tag scene of the divided frame image group to an evaluation value of the divided frame image group calculated from the evaluation value of each frame image, with a third publishing threshold value set according to the priority of publishing for each annotation tag scene.

It is preferable that in the image processing apparatus, in case where the priority of publishing for each annotation tag scene is higher, the third publishing threshold value is set to be smaller.

It is preferable that in the image processing apparatus, the priority setting unit sets the priority of publishing for an annotation tag scene, the image analysis unit analyzes the annotation tag scene of each frame image by annotation analysis and assigns an annotation tag corresponding to the analyzed scene to the frame image, in case where the divided frame image group is an annotation tag scene, the publishing/non-publishing determination unit temporarily determines whether or not to publish the divided frame image group based on the priority of publishing for the annotation tag scene of the divided frame image group, the image processing apparatus further includes: a display unit which displays a result of the temporary determination; and an input unit which receives final determination of publishing or non-publishing input by the user with reference to the result of the temporary determination displayed on the display unit, and the publishing/non-publishing determination unit mainly determines whether or not to publish the divided frame image group based on the final determination.

It is preferable that in the image processing apparatus, the publishing/non-publishing determination unit calculates an evaluation value of the divided frame image group by an arithmetic mean value, a median, a mode, or a weighted mean value of all frame images included in the divided frame image group.

It is preferable that in the image processing apparatus, the image analysis unit determines that two or more frame images, in which similar sound is consecutive are scenes with the same sound.

It is preferable that in the image processing apparatus, the image analysis unit determines that two or more frame images with different feature points are scenes with the different feature points.

It is preferable that in the image processing apparatus, the digest moving image generation unit uses only frame images, in which the evaluation value is greater than the first publishing threshold value set according to the priority of publishing for each image quality evaluation item, among frame images included in a divided frame image group determined to be published to generate the digest moving image.

It is preferable that the image processing apparatus further includes a photographing place setting unit which sets a photographing place of the moving image, at which publishing is limited, for each of the one or more category scenes, and in case where generating one digest moving image from a plurality of moving images, the digest moving image generation unit performs control regarding whether or not to include frame images, included in a divided frame image group determined to be published, in the digest moving image according to the photographing place of the moving image.

It is preferable that in the image processing apparatus, each time the frame image is extracted from the moving image by the frame image extraction unit, the image analysis unit performs image analysis of the extracted frame image.

It is preferable that in the image processing apparatus, in case where a person desired to be published and a person not desired to be published are taken simultaneously in the frame image included in the divided frame image group determined to be published, the digest moving image generation unit performs mosaic processing on the face of the person not desired to be published and includes the frame image, in which the person desired to be published and the person not desired to be published are taken simultaneously, in the digest moving image.

In addition, the invention provides an image processing method including: a step in which a frame image extraction unit extracts a plurality of frame images from a moving image; a step in which an image analysis unit performs image analysis of each frame image to determine a scene of each frame image; a step in which a frame image division unit divides the plurality of frame images into one or more divided frame image groups according to a replay order of the moving image while taking one frame image different from the scenes of preceding and following frame images in the replay order of the moving image, or two or more frame images, in which the same scene is consecutive, as a divided frame image group on the scene of each frame image; a step in which a publishing/non-publishing determination unit determines whether or not to publish each divided frame image group based on the priority of publishing for a scene of the divided frame image group; and a step in which a digest moving image generation unit combines a part or all of frame images included in the divided frame image group determined to be published to generate a digest moving image of the moving image.

It is preferable that the image processing method further includes a step in which a publishing range setting unit sets a range of users to be published for each of the one or more category scenes, wherein the publishing/non-publishing determination unit determines whether or not to publish each divided frame image group based on the priority of publishing for the scene of the divided frame image group for each type of the range of users to be published, and the digest moving image generation unit combines a part or all of frame images included in the divided frame image group determined to be published for each type of the range of users to be published and assigns access authority corresponding to the type of the range of users to be published to generate the digest moving image of each type of the range of users to be published.

In addition, the invention provides a program which causes a computer to execute the respective steps of the image processing method.

In addition, the invention provides a computer-readable recording medium having a program recorded thereon, which causes a computer to execute the respective steps of the image processing method.

In addition, the invention provides a moving image publishing system which publishes moving images, which are uploaded from one or more clients to a server through a network, to users of the clients through the network, wherein each of the clients includes a first transfer unit which uploads a moving image or a digest moving image generated by any of the image processing apparatus described above to the server through the network, and the server includes a second transfer unit which receives the moving image or the digest moving image uploaded from the client through the network, a moving image storage unit which stores the moving image or the digest moving image received by the second transfer unit, and a publishing control unit which performs control regarding whether or not to publish the digest moving image generated from the moving image stored in the moving image storage unit by the image processing apparatus or the digest moving image stored in the moving image storage unit to the user of the client through the network.

In addition, the invention provides a moving image publishing method which publishes moving images, which are uploaded from one or more clients to a server through a network, to users of the clients through the network, the moving image publishing method including: in each of the clients, a step in which a first transfer unit uploads a moving image or a digest moving image generated by the image processing method to the server through the network; in the server, a step in which a second transfer unit receives the moving image or the digest moving image uploaded from the clients through the network; a step in which a moving image storage unit stores the moving image or the digest moving image received by the second transfer unit; and a step in which a publishing control unit performs control regarding whether or not to publish a digest moving image generated from the moving image stored in the moving image storage unit by the image processing method or the digest moving image stored in the moving image storage unit to the user of the client through the network.

In addition, the invention provides a program which causes a computer to execute the respective steps of the moving image publishing method.

In addition, the invention provides a non-transitory computer-readable recording medium having a program recorded thereon, which causes a computer to execute the respective steps of the moving image publishing method.

According to the invention, the priority of publishing is set for each category scene, whereby only a portion desired to be published by the user can be extracted from the moving image based on the priority of publishing to generate the digest moving image, the generated digest moving image can be uploaded to the server, and the digest moving image uploaded to the server can be published to the user of each client.

BRIEF DESCRIPTION OF THE DRAWINGS

FIGS. 5A, 5B, and 5C are conceptual diagrams showing an example of a setting screen for setting the priority of publishing of an image quality evaluation item, an appearing person, and an annotation tag scene.

FIG. 6 is a conceptual diagram showing an example of an aspect of extracting a plurality of frame images from a moving image.

DESCRIPTION OF THE PREFERRED EMBODIMENTS

Hereinafter, an image processing apparatus, an image processing method, a moving image publishing system, a moving image publishing method, and a non-transitory computer-readable recording medium having a program recorded thereon of the invention will be described in detail based on a preferred embodiment shown in the accompanying drawings.

Figure 1:
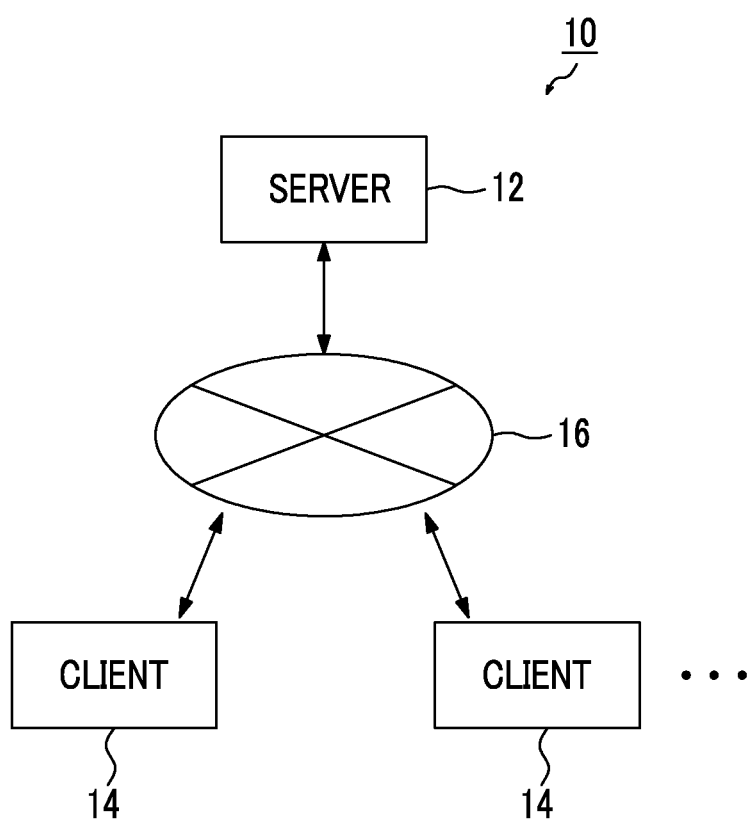
FIG. 1 is a block diagram showing the configuration of a moving image publishing system according to an embodiment of the invention.

FIG. 1 is a block diagram showing the configuration of a moving image publishing system according to an embodiment of the invention. A moving image publishing system 10 shown in FIG. 1 includes a server 12, and one or more clients 14 connected to the server 12 through a network 16, such as the Internet. The server 12 includes, for example, a control device constituted by a central processing unit (CPU), a storage device constituted by a hard disk or a memory, a communication device constituted by a communication module, and the like. The moving image publishing system 10 publishes moving images, which are uploaded from one or more clients 14 to the server 12 through the network 16, to the users of the clients 14 through the network 16.

Figure 2:
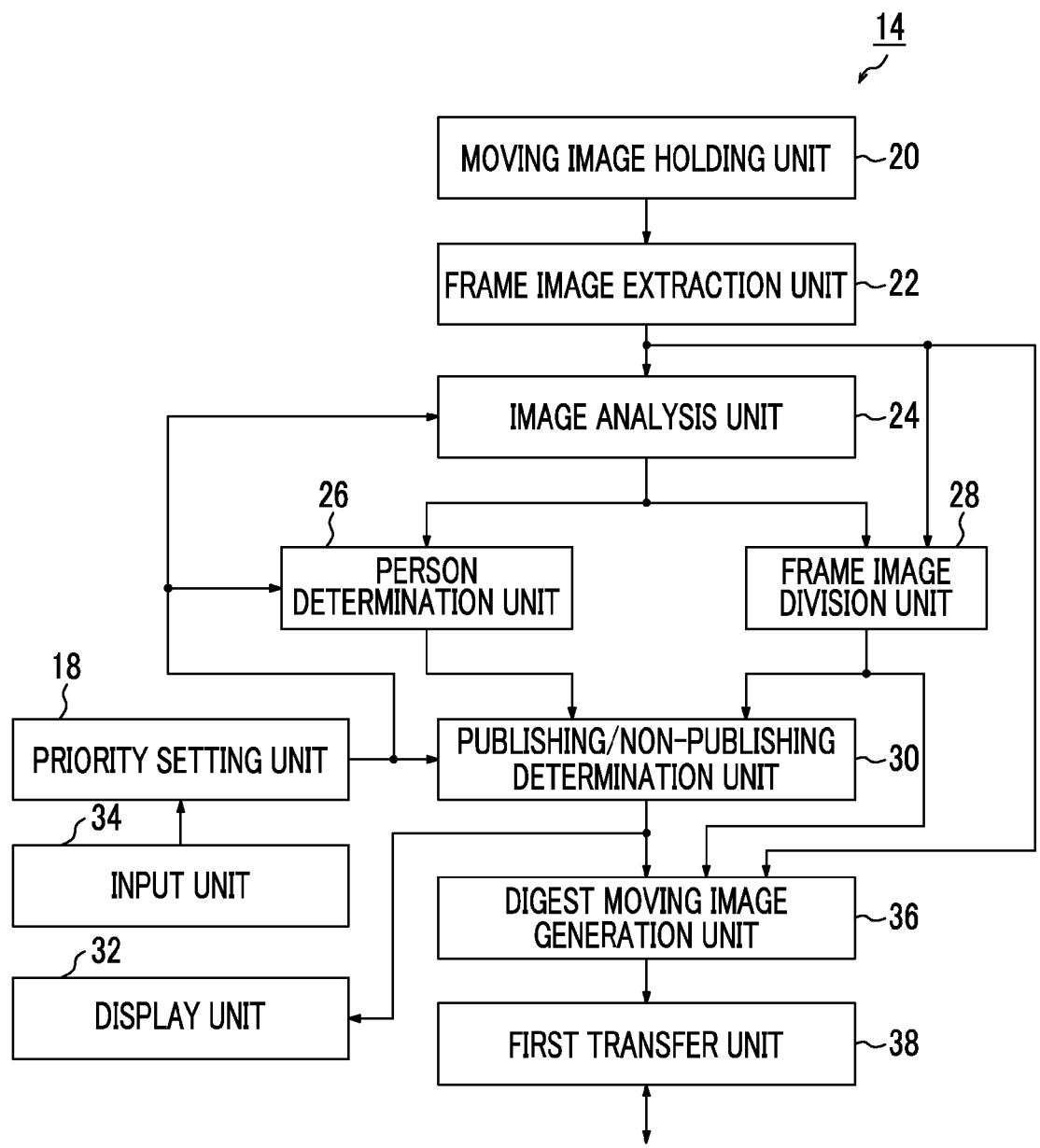
FIG. 2 is a block diagram showing the configuration of each client shown in FIG. 1 according to the embodiment.

FIG. 2 is a block diagram showing the configuration of each client shown in FIG. 1 according to the embodiment. Each client 14 is, for example, a terminal apparatus which becomes an image processing apparatus of the invention used by each user, such as a personal computer (PC), a smartphone, or a tablet terminal. As shown in FIG. 2, the client 14 includes a priority setting unit 18, a moving image storage unit 20, a frame image extraction unit 22, an image analysis unit 24, a person determination unit 26, a frame image division unit 28, a publishing/non-publishing determination unit 30, a display unit 32, an input unit 34, a digest moving image generation unit 36, and a first transfer unit 38. The input unit 34 is constituted by, for example, input devices, such as a mouse, a keyboard, and a touch sensor. The moving image storage unit 20 is constituted by, for example, a storage device, such as a hard disk drive (HDD) or a memory card. The display unit 32 is constituted by, for example, a display device, such as a liquid crystal display. The first transfer unit 38 is constituted by, for example, a communication device. The priority setting unit 18, the frame image extraction unit 22, the image analysis unit 24, the person determination unit 26, the frame image division unit 28, the publishing/non-publishing determination unit 30, and the digest moving image generation unit 36 are implemented by, for example, the control device, such as a CPU, which executes a program loaded on the memory.

The priority setting unit 18 sets the priority of publishing for each of one or more category scenes.

The priority setting unit 18 sets the priority of publishing for each image quality evaluation item with regard to a photographing failure scene, sets the priority of publishing for each appearing person with regard to a person scene, and sets the priority of publishing or the like for each annotation tag scene, in which an annotation tag is assigned to each frame image by annotation analysis.

Here, a scene indicates various scenes included in a moving image, such as a photographing failure scene, a person scene, and an annotation tag scene, and is constituted by one frame image or two or more frame image groups extracted from a moving image. An annotation tag scene refers to a scene in an image with an annotation tag corresponding to the theme (scene) of a specific image as described below.

The image quality evaluation item is an item for evaluating image quality of a moving image (each frame image), and blurring/shift, brightness, contrast, and the like can be considered. In case where the degree of blurring/shift of a frame image is large, in case where a frame image is extremely bright or dark, or in case where contrast of a frame image is bad, or the like, it can be determined to be a photographing failure scene. It is considered that the user does not desire to publish such a frame image.

An appearing person is, for example, a person (person image) registered in advance in order for the person determination unit 26 to perform person determination. It is desirable that each person appearing in a moving image is registered as an appearing person.

Annotation analysis is processing for analyzing a scene (primarily, a scene other than a scene including a person) of a frame image. If a scene of a frame image is analyzed by annotation analysis, an annotation tag corresponding to the analyzed scene is assigned to the frame image.

Annotation tags are set in advance into baby, trip, marriage, child, and other themes.

A theme of baby includes, for example, annotation tags corresponding to scenes, such as limb, face, outing, shrine visit, bath, bed, indoor, and cake.

A theme of trip includes annotation tags corresponding to scenes, such as cooking, animal, natural scenery, sandy beach, grassland, sea, night, evening, underwater, plant, street, market, gold, sculpture, scenery, Tokyo, illumination, indoor, sky, rock and soil, autumn tint, cherry blossom, whiteness, darkness, and close-up.

A theme of marriage includes, for example, annotation tags corresponding to scenes, such as bouquet, wedding cake, group photo, cooking, blessing, ceremony, indoor, light, stained glass, spotlight, and warm-colored light.

A theme of child includes, for example, annotation tags corresponding to scenes, such as cake, candle, outdoor play, sandy beach, sports meet, sea, pool, night, castle, mountain, the earth, lunch, cooking, evening, animal, darkness, plant, meeting, rock and soil, street, and close-up.

Other themes include, for example, annotation tags corresponding to scenes, such as animal, bed, bouquet, cake, candle, castle, blessing, ceremony, cherry blossom, darkness, cooking, evening, sports meet, grassland, gold, nature (or verdure), meeting, firework, autumn tint, scenery, illumination, market, mountain, night, plant, rock and soil, sandy beach, sea, shrine, sky, special cake (for example, wedding cake or the like), the earth, spotlight, sculpture, street, Tokyo, underwater, close-up, and snow (or winter).

The moving image storage unit 20 stores a moving image before processing for generating a digest moving image.

The frame image extraction unit 22 extracts a plurality of frame images from the moving image stored in the moving image storage unit 20.

A method of extracting a frame image from a moving image is not limited. For example, a frame image may be extracted from a moving image at a given time interval. Alternatively, a key frame image, such as a turning point of a scene, may be extracted using a key frame extraction (KFE) technique.

The image analysis unit 24 performs image analysis of each frame image extracted from the moving image by the frame image extraction unit 22 to determine a scene of each frame image.

In this embodiment, image analysis unit 24 performs image analysis of each frame image with regard to each image quality evaluation item set in the priority setting unit 18 to calculate an evaluation value (analysis score) of each frame image and determines whether a scene is a photographing failure scene according to the evaluation value of the frame image.

The image analysis unit 24 performs image analysis of each frame image to detect the presence or absence of a face and determines whether or not a scene is a person scene according to the presence or absence of the face. In this case, the image analysis unit 24 extracts a face image from each frame image in which it is detected that a face is present and which is a person scene.

In case where it is determined that a scene is not a person scene, the image analysis unit 24 assigns an annotation tag corresponding to the analyzed scene to each frame image by annotation analysis.

The person determination unit 26 performs central person determination of the face image extracted from each frame image by the image analysis unit 24 to determine a rank of each person appearing in the moving image.

In the central person determination, for example, the same person determination processing is performed on a plurality of face images extracted from each frame image, and a plurality of face images are classified into image groups each having the face image of the same person. Subsequently, a person corresponding to each image group is specified based on an image of each appearing person set in the priority setting unit 18. Subsequently, one or more persons among the specified persons are determined as a central person, and one or more persons having high relevance to the central person among the persons other than the central person are determined as an important person. A rank is assigned to each of the central persons and the important persons according to importance.

For example, a person with the largest number of detected face images can be determined as a central person, or a person with a large number of frame images photographed along with the central person among the persons other than the central person can be determined as an important person.

The distance between the face image of the central person and the face image of a person other than the central person photographed in the same frame image may be calculated, and a person with a close distance between the face images may be determined as an important person.

An important person may be determined based on one or both of the difference between photographing date and time information of a frame image in which the central person is photographed and photographing date and time information of a frame image in which a person other than the central person is photographed, and the difference between photographing position information of the frame image in which the central person is photographed and photographing position information of the frame image in which the person other than the central person is photographed.

The frame image division unit 28 divides a plurality of frame images, which are extracted from the moving image by the frame image extraction unit 22 based on the scene of each frame image determined by the image analysis unit 24, into two or more divided frame image groups according to a replay order of the moving image.

For example, the frame image division unit 28 divides one frame image of a person scene or two or more frame images, in which the scene of the same person is consecutive, from the head of the moving image as a divided frame image group of the person scene. In regard to the following frame images, similarly, a plurality of frame image group are divided into one or more divided frame image groups according to the replay order of the moving image while taking one frame image of a scene different from preceding and following frame images in the replay order of the moving image, or two or more frame images, in which the same scene is consecutive, as a divided frame image group.

The publishing/non-publishing determination unit 30 determines whether or not to publish each divided frame image group based on the priority of publishing for the scene of the divided frame image group set in the priority setting unit 18.

Though details will be described below, the display unit 32 displays a result of temporary determination of publishing or non-publishing in case where the publishing/non-publishing determination unit 30 manually performs determination of publishing or non-publishing.

The input unit 34 receives the priority of publishing of each of one or more category scenes of the moving image input by the user, or final determination of publishing or non-publishing input by the user with reference to the result of the temporary determination displayed on the display unit 32.

The digest moving image generation unit 36 combines a part or all of the frame images included in the divided frame image group determined to be published by the publishing/non-publishing determination unit 30 to generate a digest moving image of the moving image.

The first transfer unit 38 uploads the digest moving image generated by the digest moving image generation unit 36 to the server 12 through the network 16.

Figure 3:
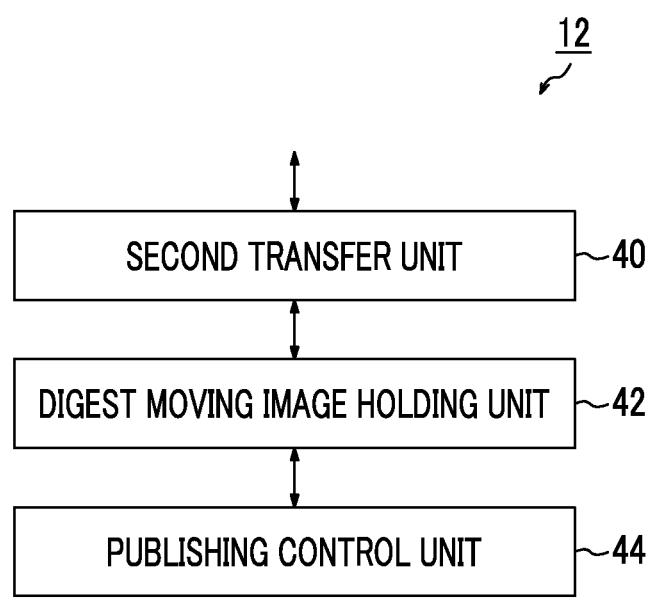
FIG. 3 is a block diagram showing the configuration of a server shown in FIG. 1 according to the embodiment.

FIG. 3 is a block diagram showing the configuration of the server shown in FIG. 1 according to the embodiment. As shown in FIG. 3, the server 12 includes a second transfer unit 40, a digest moving image storage unit 42, and a publishing control unit 44.

The second transfer unit 40 receives a digest moving image uploaded from each client 14 through the network 16.

The digest moving image storage unit (moving image storage unit) 42 stores the digest moving image received by the second transfer unit 40.

The publishing control unit 44 performs control regarding whether or not to publish the digest moving image stored in the digest moving image storage unit 42 to the user of each client 14 through the network 16.

Figure 4:
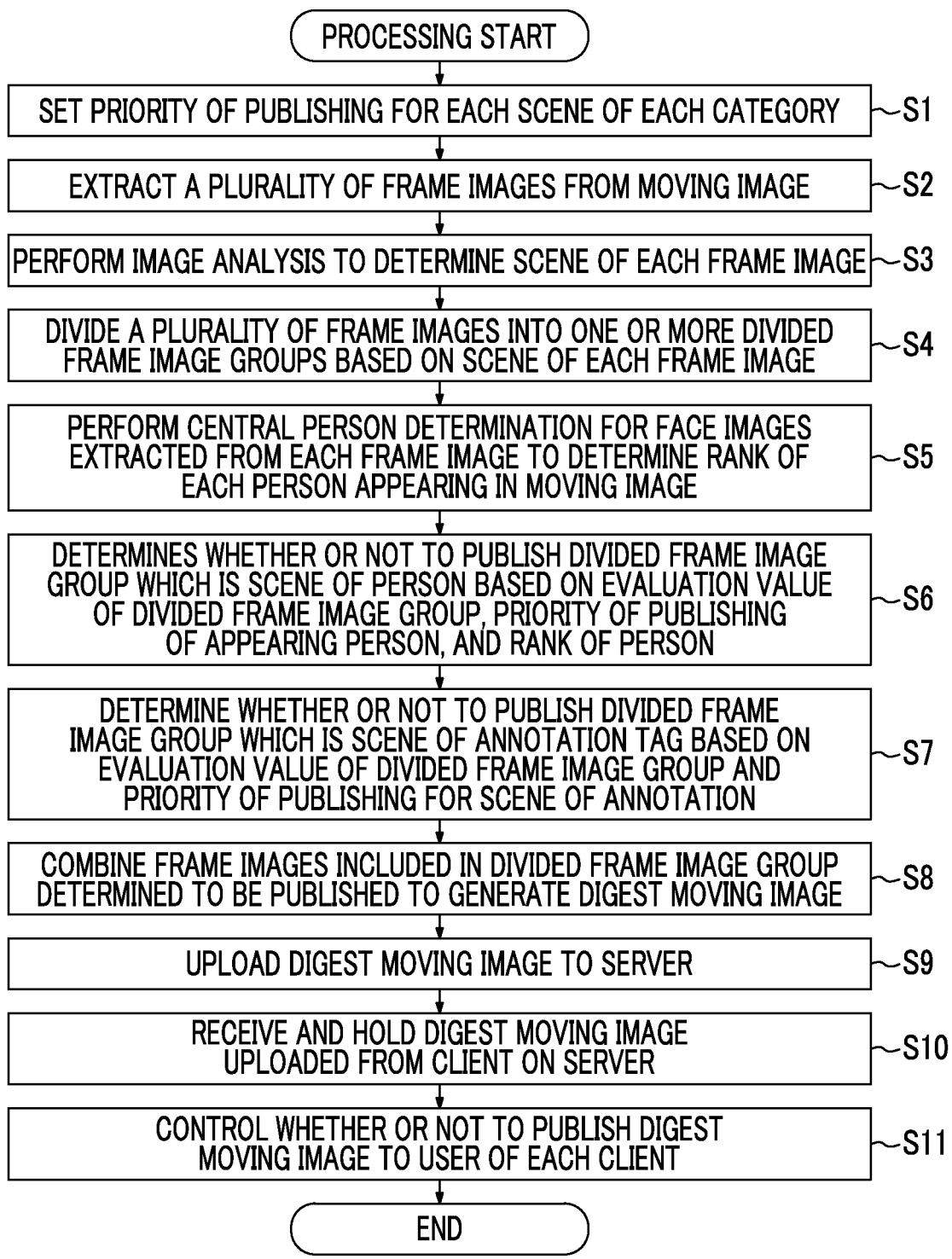
FIG. 4 is a flowchart showing the operation of the moving image publishing system according to the embodiment.

Next, the operation of the moving image publishing system 10 will be described referring to the flowchart shown in FIG. 4.

First, the user inputs the priority of publishing for each of one or more category scenes of a moving image through the input unit 34. That is, the user can input the priority of publishing for each category scene of the moving image, and the priority of publishing for each category scene input by the user is set in the priority setting unit 18 (Step S1).

In this embodiment, as the priority of publishing for each category scene of a moving image, the priority of publishing for each image quality evaluation item is set in three levels of high, middle, and low on a setting screen shown in FIG. 5A, the priority of publishing for each appearing person is set in three levels of high, middle, and low on a setting screen of FIG. 5B, and the priority of publishing for each annotation tag scene is set by the user in three levels of high, middle, and low on a setting screen shown in FIG. 5C.

The priority of publishing is not limited to the three levels, and may be set in several stages.

The priority of publishing corresponds to an evaluation value (analysis score) of a frame image, and in case where the priority of publishing is higher, a publishing threshold value described below is set to be smaller. That is, in case where the priority of publishing is higher, the publishing threshold value is set to be lower. With this, in case where the priority of publishing is high, the publishing threshold value is lower than in case where the priority of publishing is low, and even if the evaluation values of the frame images are the same, a frame image with high priority of publishing is more easily published than a frame image with low priority of publishing.

Subsequently, as shown in FIG. 6, a plurality of frame images are extracted from the moving image by the frame image extraction unit 22 (Step S2).

Subsequently, image analysis of each extracted frame image is performed by the image analysis unit 24, and a scene of each frame image is determined (Step S3).

In this embodiment, the image analysis unit 24 performs image analysis of each frame image with regard to each image quality evaluation item to calculate the evaluation value (analysis score) of each frame image, detects the presence or absence of a face to detect a face image from each frame image, or analyzes the scene of each frame image by annotation analysis to assign an annotation tag.

Figure 7:
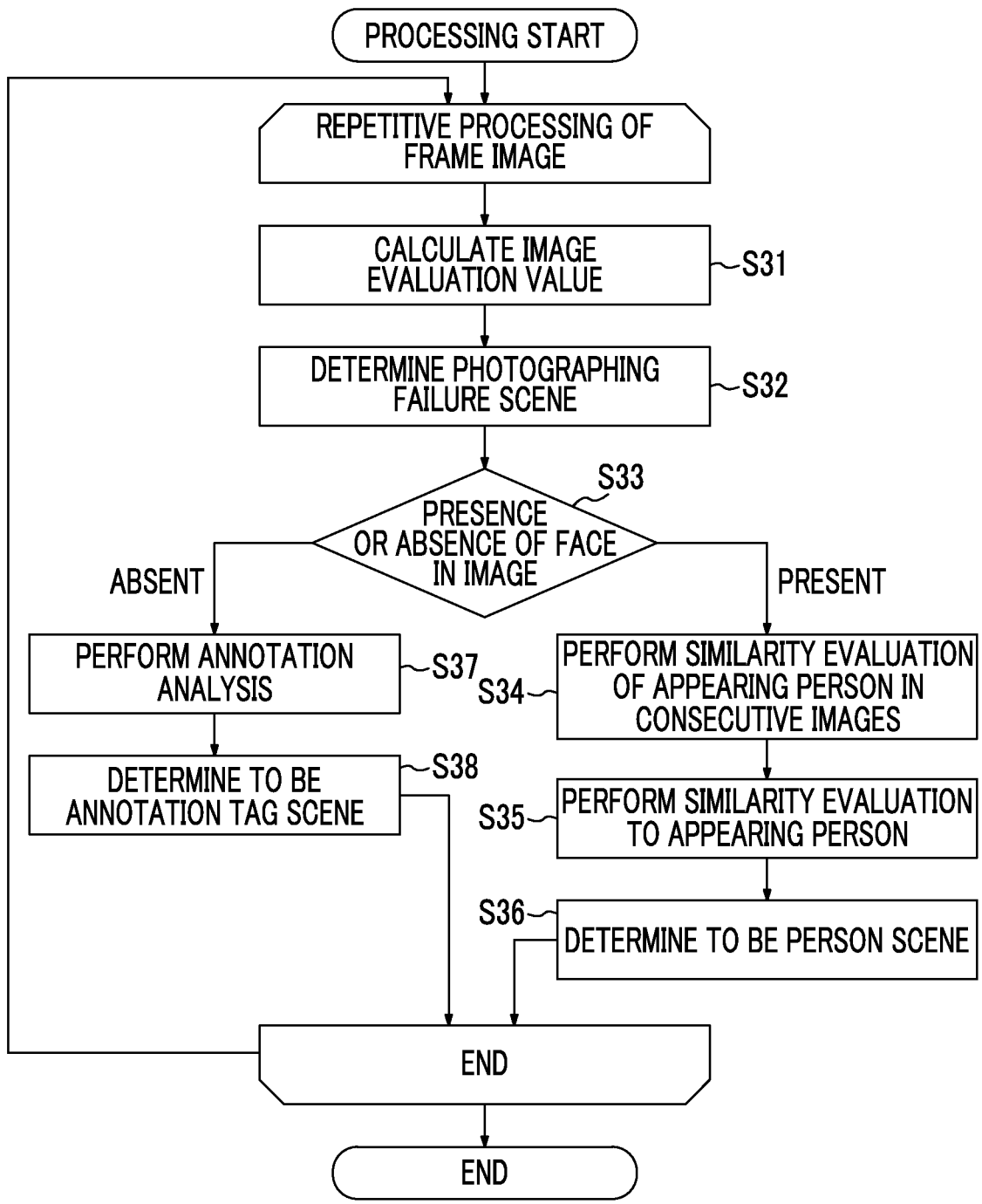
FIG. 7 is a flowchart showing an example of the operation of an image analysis unit.

As shown in the flowchart of FIG. 7, the image analysis unit 24 repeatedly performs the following processing on each frame image (repetitive processing of frame image).

The image analysis unit 24 first performs image analysis of the frame image with regard to each image quality evaluation item to calculate the evaluation value of the frame image (Step S31).

Subsequently, the publishing/non-publishing determination unit 30 determines whether or not the frame image is a photographing failure scene (Step S32).

In this case, the publishing/non-publishing determination unit 30 determines whether or not to publish each frame image based on a result of comparing the evaluation value of the frame image with a first publishing threshold value set according to the priority of publishing for each image quality evaluation item. As a result, as shown in Expression (1), in case where the evaluation value of the frame image is smaller than the first publishing threshold value, it is determined to be a photographing failure scene. The photographing failure scene is basically a non-publishing scene.

first publishing threshold value>evaluation value of frame image    Expression (1)

Subsequently, the image analysis unit 24 detects the presence or absence of a face (person) in the frame image (Step S33).

In case where it is determined that a face is present in the frame image ("PRESENT" in Step S33), the image analysis unit 24 extracts a face image from the frame image, in which it is determined that a face is present and which is a person scene, and performs similarity evaluation of persons appearing in consecutive frame images (Step S34) and similarity evaluation of a person (image) appearing in the frame image and an appearing person (image) set in the priority setting unit 18 (Step S35) to determine whether or not the same number of persons continue to appear. As a result, the image analysis unit 24 determines that a scene in which the same number of persons continue to appear is a scene in which the same number of persons appear (Step S36). For example, it is determined that a scene in which one person continues to appear is a person scene including one person.

Since a moving image is consecutively photographed, in case where the number of appearing persons is not changed, it is considered that the same persons continue to appear in the moving image. On the other hand, in case where the number of appearing persons is changed, it is necessary to distinguish a scene in order to perform publishing determination for each person.

In contrast, in case where it is determined that a face is absent in the frame image ("ABSENT" in Step S33), the image analysis unit 24 performs annotation analysis (Step S37) to determine the scene of the frame image (Step S38).

In this embodiment, with the annotation analysis, the evaluation value of the frame image for the scene of each annotation tag is calculated. As a result, as shown in Expression (2), in case where the maximum value of the evaluation value of the frame image for each annotation tag scene is greater than a tag threshold value set in advance, the image analysis unit 24 determines that the scene of the frame image is an annotation tag scene in which the evaluation value of the frame image is a maximum value. An annotation tag corresponding to the scene is assigned to the frame image in which the scene is analyzed. As a result, it is determined that the analyzed frame image is a scene represented by the assigned annotation tag.

maximum value of evaluation value of annotation tag scene>tag threshold value    Expression (2)

In case where determining a scene, the image analysis unit 24 may determine that two or more frame images in which similar sound continues are scenes with the same sound, or may determine that two or more frame images with different feature points (scene change, fluctuation of great interest (object to be photographed), or the like) are scenes with different feature points.

Figure 8:
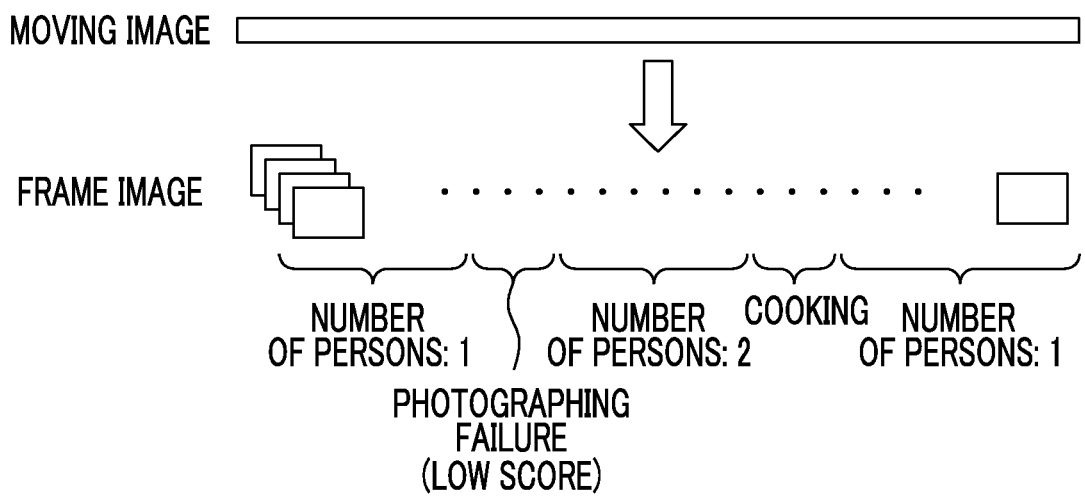
FIG. 8 is a conceptual diagram showing an example of an aspect in which a plurality of frame images are divided into a plurality of divided frame image groups.

Subsequently, as shown in FIG. 8, a plurality of frame images are divided into one or more divided frame image groups according to the replay order of the moving image by the frame image division unit 28 while taking one frame image different from the scenes of preceding and following frame images in the replay order of the moving image, or two or more frame images, in which the same scene is consecutive, as a divided frame image group based on the scene of each frame image (Step S4).

In the example shown in FIG. 8, a plurality of frame images extracted from the moving image by the frame image extraction unit 22 are divided into a scene of "NUMBER OF PERSONS: 1", a scene of "PHOTOGRAPHING FAILURE (LOW SCORE)", a scene of "NUMBER OF PERSONS: 2", a scene of "COOKING (ANNOTATION TAG)", and a scene of "NUMBER OF PERSONS: 1".

As described above, the image analysis unit 24 determines that frame images with a different number of appearing persons are different scenes in order to perform publishing determination for each person. As a result, the frame image division unit 28 divides frame images with a different number of appearing persons into different divided frame image groups.

Subsequently, central person determination is performed by the person determination unit 26 on the face images extracted from each frame image to determine a rank of each person appearing in the moving image (Step S5).

Subsequently, determination regarding whether or not to publish a divided frame image group which is a person scene is performed by the publishing/non-publishing determination unit 30. In this case, the publishing/non-publishing determination unit 30 may automatically determine publishing or non-publishing or may manually determine publishing or non-publishing by the selection of the user.

In case where performing automatic determination, the publishing/non-publishing determination unit 30 first calculates an evaluation value of the divided frame image group from the evaluation value of each frame image. The evaluation value of the divided frame image group can be calculated by, for example, a median, a mode, or a weighted mean value, in addition to an arithmetic mean value of the evaluation values of all frame images included in the divided frame image group.

Subsequently, as shown in Expression (3), a first overall evaluation value is calculated by adding a first weighting coefficient C1 determined from the priority of publishing of the appearing person corresponding to a person appearing in the divided frame image group and a second weighting coefficient C2 determined from the rank of the person corresponding to the person appearing in the divided frame image group to the evaluation value of the divided frame image group.

It is determined whether or not to publish the divided frame image group based on a result of comparing the first overall evaluation value with a second publishing threshold value set according to the priority of publishing for each appearing person. That is, in case where the first overall evaluation value is greater than the second publishing threshold value, it is determined to publish the divided frame image group (Step S6).

$$\text{evaluation value of frame image group} * C1 * C2 > \text{second publishing threshold value} \quad \text{Expression (3)}$$

Figure 9:
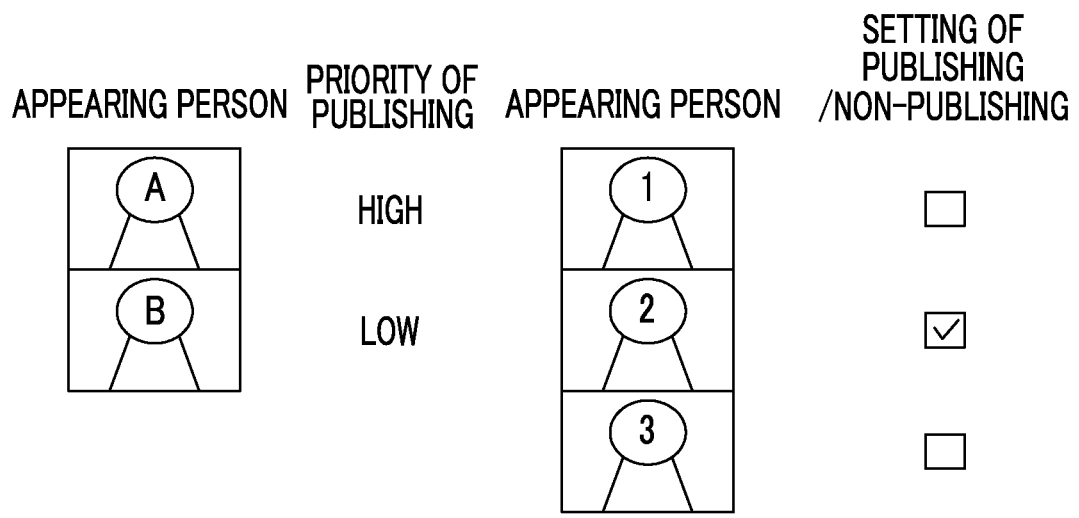
FIG. 9 is a conceptual diagram showing an example of a result of temporary determination of publishing or non-publishing by a publishing/non-publishing determination unit.

In case where performing manual determination, the publishing/non-publishing determination unit 30 first temporarily determines whether or not to publish the divided frame image group based on the priority of publishing of the appearing person corresponding to the person appearing in the divided frame image group, and as shown in FIG. 9, displays a result of temporary determination on the display unit 32.

A left end of FIG. 9 shows appearing persons A and B, a second view from the left shows that the priorities of publishing of appearing persons A and B are high and low, a third view from the left show persons 1, 2, and 3 appearing in the divided frame image group, and a right end of FIG. 9 shows a result of temporary determination (setting of publishing or non-publishing). In this example, since the priority of publishing of the appearing person A is high, the person 2 appearing in the divided frame image group is the appearing person A, and a result of temporary determination to publish the divided frame image group in which the person 2 appears is displayed on the display unit 32.

Subsequently, final determination of publishing or non-publishing is input by the user through the input unit 34 with reference to the result of temporary determination.

Main determination (determination) regarding whether or not to publish the divided frame image group is performed based on the final determination acquired by the input unit 34.

Subsequently, it is determined by the publishing/non-publishing determination unit 30 whether or not to publish a divided frame image group which is an annotation tag scene. In this case, similarly, the publishing/non-publishing determination unit 30 may automatically determine publishing or non-publishing, or may manually determine publishing or non-publishing by the selection of the user.

In case where performing automatic determination, similarly, the publishing/non-publishing determination unit 30 first calculates the evaluation value of the divided frame image group from the evaluation value of each frame image.

Subsequently, as shown in Expression (4), a second overall evaluation value is calculated by adding a third weighting coefficient C3 determined from the priority of publishing for the annotation tag scene of the divided frame image group to the evaluation value of the divided frame image group.

It is determined whether or not to publish the divided frame image group based on a result of comparing the second overall evaluation value with a third publishing threshold value set according to the priority of publishing for each annotation tag scene. That is, in case where the second overall evaluation value is greater than the third publishing threshold value, it is determined to publish the divided frame image group (Step S7).

$$\text{divided frame image group} * C3 > \text{third publishing threshold value} \quad \text{Expression (4)}$$

In case where performing manual determination, similarly, the publishing/non-publishing determination unit 30 first temporarily determines whether or not to publish the divided frame image group based on the priority of publishing for the annotation tag scene of the divided frame image group and displays a result of temporary determination on the display unit 32.

Subsequently, final determination of publishing or non-publishing is input by the user through the input unit 34 with reference to the result of temporary determination.

It is mainly determined whether or not to publish the divided frame image group based on the final determination acquired by the input unit 34.

Subsequently, a part or all of the frame images included in the divided frame image group determined to be published are combined by the digest moving image generation unit 36, and a digest moving image of the moving image is generated (Step S8).

Here, only the frame images, in which the evaluation value is greater than the first publishing threshold value, among the frame images included in the divided frame image group determined to be published are used, whereby only some "fine" scenes can be extracted to generate a digest moving image.

Figure 10:
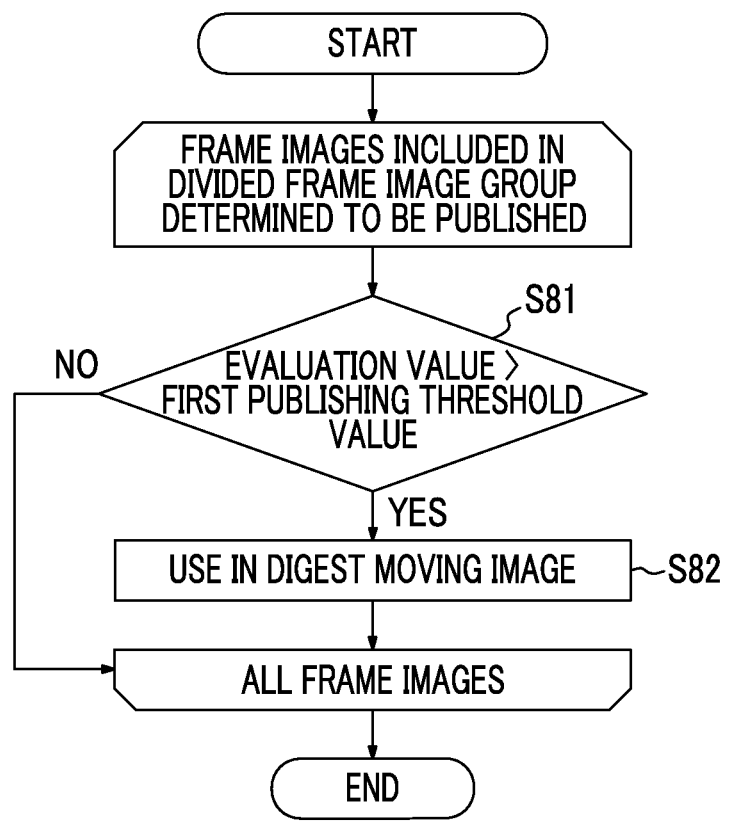
FIG. 10 is a flowchart showing an example of the operation of a digest moving image generation unit.

In this case, as shown in the flowchart of FIG. 10, the digest moving image generation unit 36 repeatedly performs the following processing on all frame images included in the divided frame image group determined to be published.

The digest moving image generation unit 36 first determines whether or not the evaluation value of the frame image is greater than the first publishing threshold value (Step S81).

As a result, in case where the evaluation value of the frame image is greater than the first publishing threshold value (YES in Step S81), the frame image is used in the digest moving image (Step S82). On the other hand, in case where the evaluation value of the frame image is equal to or less than the first publishing threshold value (NO in Step S81), the frame image is not used in the digest moving image.

Subsequently, the digest moving image is uploaded to the server 12 through the network 16 by the first transfer unit 38 (Step S9).

In the server 12, the digest moving image uploaded from the client 14 through the network 16 is received by the second transfer unit 40 and is stored in the digest moving image storage unit 42 (Step S10).

The publishing control unit 44 performs control regarding whether or not to publish the digest moving image stored in the digest moving image storage unit 42 to the user of each client 14 through the network 16 (Step S11).

In this way, in the moving image publishing system 10, the priority of publishing can be set for each category scene, only a portion desired to be published by the user can be extracted from the moving image based on the priority of publishing to generate the digest moving image, the generated digest moving image is uploaded to the server 12, and the digest moving image uploaded to the server 12 can be published to the user of each client 14.

Each client 14 may include a publishing range setting unit which sets a range of users to be published for each of one or more category scenes, a different digest moving image may be generated for each type of the range of users to be published, and the digest moving image of each type of the range of users to be published may be published only to the user of the client 14 in the range to be published.

In this case, first, as shown in Table 1, the range of users to be published is set for each of one or more category scenes by the publishing range setting unit.

In the example of Table 1, for example, the range of users to be published is set such that only the user can access (only the user can read) the scene including the person A, friends on an SNS also can access (the user and the friends on the SNS can read) the scene including the person B, and full access is permitted to (all users on the SNS can read) the scene including the person C.

TABLE 1

| Category | Priority of Publishing | Range of Users to be Published |
|---|---|---|
| Person A | High | Only User |
| Person B | Middle | Friends on SNS are also Possible |
| Person C | Low | Full Access is Possible |
| Cooking | High | Full Access is Possible |
| Limb | Middle | Friends on SNS are also Possible |

The operation in case where the priority of publishing is set in the priority setting unit 18, the operation in case where a plurality of frame images are extracted from the moving image by the frame image extraction unit 22, the operation in case where the scene of each frame image is determined by the image analysis unit 24, the operation in case where a plurality of frame images are divided into one or more divided frame image groups by the frame image division unit 28, and the operation in case where the central person determination is performed by the person determination unit 26 to determine the rank of each person appearing in the moving image are as described above.

Subsequently, it is determined by the publishing/non-publishing determination unit 30 whether or not to publish each divided frame image group based on the priority of publishing for the scene of the divided frame image group for each type of the range of users to be published.

Subsequently, a part or all of the frame images included in the divided frame image group determined to be published by the publishing/non-publishing determination unit 30 are combined by the digest moving image generation unit 36 for each type of the range of users to be published, and access authority corresponding to the type of the range of users to be published is assigned to generate the digest moving image for each type of the range of users to be published.

Subsequently, the digest moving image of each type of the range of users to be published is uploaded to the server 12 by the first transfer unit 38.

In the server 12, the digest moving image uploaded from the client 14 for each type of the range of users to be published is received by the second transfer unit 40 and is stored in the digest moving image storage unit 42.

Subsequently, control is performed by the publishing control unit 44 such that the digest moving image stored in the digest moving image storage unit 42 for each type of the range of users to be published is published to the user of the client 14 corresponding to access authority assigned to the digest moving image.

In case where generating one digest moving image from a plurality of moving images, publishing may be limited according to the photographing place of the moving images. In this case, each client 14 includes a photographing place setting unit which sets a photographing place (geographical information) of a moving image, at which publishing is limited, for each of one or more category scenes.

For example, the digest moving image generation unit 36 can perform control regarding whether or not to include the frame images, which are included in the divided frame image group determined to be published, according to the photographing place of the moving image such that a moving image (divided frame image group, frame images) photographed around home should be excluded from the digest moving image, in the digest moving image.

After all of a plurality of frame images are extracted from the moving image by the frame image extraction unit 22, instead of performing image analysis of each frame image by the image analysis unit 24, each time a frame image is extracted from the moving image by the frame image extraction unit 22, image analysis of the extracted frame image may be performed. That is, the image analysis unit 24 may execute image analysis of the frame image at the same time the frame image is extracted from the moving image.

In this case, for example, in the case of a frame image in which a person is photographed, or a frame image with a high evaluation value as a result of image analysis, the time interval until a frame image is next extracted can be shortened. Conversely, in the case of a frame image in which a person is not photographed, or a frame image with a low evaluation value, the time interval until a frame image is next extracted can be extended. With this, image analysis of a frame image of highest cost is performed in detail for an important portion and is performed rarely for an unimportant portion, whereby image analysis can be performed with high precision and at high speed.

In case where a person desired to be published and a person not desired to be published are taken simultaneously in a frame image included in a divided frame image group determined to be published, the digest moving image generation unit 36 may perform mosaic processing on the face of the person not desired to be published and may include the frame image in the digest moving image.

In the foregoing embodiment, although the client 14 includes the priority setting unit 18, the moving image storage unit 20, the frame image extraction unit 22, the image analysis unit 24, the person determination unit 26, the frame image division unit 28, the publishing/non-publishing determination unit 30, the display unit 32, the input unit 34, the digest moving image generation unit 36, and the first transfer unit 38, the invention is not limited thereto, and one client 14 is not required to include all constituent elements.

For example, the server 12 may include at least one of the constituent elements other than the first transfer unit 38, each of a plurality of clients 14 may include at least one of the constituent elements other than the first transfer unit 38, or each of the server 12 and a plurality of clients 14 may include at least one of the constituent elements other than the first transfer unit 38.

In case where generating a digest moving image from a moving image in the server 12, a moving image is uploaded by the first transfer unit 38 of the client 14, and the uploaded moving image is received by the second transfer unit 40 of the server 12 and is stored in the digest moving image storage unit (moving image storage unit) 42. A digest moving image is generated from the moving image stored in the digest moving image storage unit 42 by the digest moving image generation unit 36, and control is performed by the publishing control unit 44 regarding whether or not to publish the digest moving image generated by the digest moving image generation unit 36 to the users of the clients 14.

In this way, a plurality of processing apparatuses, such as the server 12 and the client 14, may include at least one of the constituent elements constituting the image processing apparatus such that the processing for generating the digest moving image may be shared among a plurality of processing apparatuses.

The respective elements in the apparatus of the invention may be constituted by dedicated hardware, or the respective elements may be constituted by a programmed computer.

The method of the invention can be executed by, for example, a program which causes a computer to execute the respective steps. In addition, a computer-readable recording medium having the program recorded thereon may be provided.

The invention is basically as described above.

Although the invention has been described in detail, the invention is not limited to the foregoing embodiment, and various improvements or alterations may be made without departing from the spirit and scope of the invention.

What is claimed is:

1. An image processing apparatus comprising:
 a processor configured to perform,
 extracting a plurality of frame images from a moving image,
 performing image analysis of each frame image to determine a scene of each frame image,
 dividing the plurality of frame images into one or more divided frame image groups according to a replay order of the moving image while taking one frame image different from the scenes of preceding and following frame images in the replay order of the moving image, or two or more frame images, in which the same scene is consecutive, as a divided frame image group based on the scene of each frame image,
 determining whether or not to publish each divided frame image group based on the priority of publishing for a scene of the divided frame image group, combining a part or all of frame images included in the divided frame image group determined to be published to generate a digest moving image of the moving image, and
 setting a range of users to be published for each of one or more category scenes,
 wherein the processor determines whether or not to publish each divided frame image group based on the priority of publishing for the scene of the divided frame image group for each type of the range of users to be published, and the processor combines a part or all of frame images included in the divided frame image group determined to be published for each type of the range of users to be published and assigns access authority corresponding to the type of the range of users to be published to generate a digest moving image of each type of the range of users to be published.

2. The image processing apparatus according to claim 1, the processor further configured to perform:
 setting the priority of publishing for each of one or more category scenes.

3. The image processing apparatus according to claim 2,
 wherein the processor sets the priority of publishing for each image quality evaluation item,
 the processor performs image analysis of each frame image with regard to each image quality evaluation item to calculate an evaluation value of each frame image, and
 the processor determines whether or not to publish each frame image based on a result of comparing the evaluation value of each frame image with a first publishing threshold value set according to the priority of publishing for each image quality evaluation item.

4. The image processing apparatus according to claim 3,
 wherein, in case where the priority of publishing for each image quality evaluation item is higher, the first publishing threshold value is set to be smaller.

5. The image processing apparatus according to claim 3,
 wherein the processor sets the priority of publishing for each appearing person,
 the processor performs image analysis of each frame image to detect the presence or absence of a face and extracts a face image from each frame image in which it is detected that the face is present and which is a person scene,
 the processor further configured to perform:
 performing central person determination of the face image extracted from each frame image to determine a rank of each person appearing in the moving image,
 the processor divides frame images with a different number of appearing persons into different divided frame image groups, and
 in case where the divided frame image group is a person scene, the processor determines whether or not to publish the divided frame image group based on a result of comparing a first overall evaluation value, which is obtained by adding a first weighting coefficient determined from the priority of publishing of the appearing person corresponding to a person appearing in the divided frame image group and a second weighting coefficient determined from the rank of the person corresponding to the person appearing in the divided frame image group, to an evaluation value of the divided frame image group calculated from the evaluation value of each frame image, with a second publishing threshold value set according to the priority of publishing for each appearing person.

6. The image processing apparatus according to claim 5,
 wherein, in case where the priority of publishing for each appearing person is higher, the second publishing threshold value is set to be smaller.

7. The image processing apparatus according to claim 3,
 wherein the processor sets the priority of publishing for each appearing person,
 the processor performs image analysis of each frame image to detect the presence or absence of a face and extracts a face image from each frame image in which it is detected that the face is present and which is a person scene, the processor further configured to perform:

performing person determination of the face image extracted from each frame image, dividing frame images with a different number of appearing persons into different divided frame image groups, in case where the divided frame image group is a person scene, the processor temporarily determines whether or not to publish the divided frame image group based on the priority of publishing of the appearing person corresponding to the person appearing in the divided frame image group, the image processing apparatus further comprises:

a display unit which displays a result of the temporary determination; and an input unit which receives final determination of publishing or non-publishing input by the user with reference to the result of the temporary determination displayed on the display unit, and the processor mainly determines whether or not to publish the divided frame image group based on the final determination.

8. The image processing apparatus according to claim 3, wherein the processor sets the priority of publishing for an annotation tag scene, the processor performs image analysis of each frame image to calculate the evaluation value of each frame image, analyzes the annotation tag scene of each frame image by annotation analysis, and assigns an annotation tag corresponding to the analyzed scene to the frame image, and in case where the divided frame image group is an annotation tag scene, the processor determines whether or not to publish the divided frame image group based on a result of comparing a second overall evaluation value, which is obtained by adding a third weighting coefficient determined from the priority of publishing for the annotation tag scene of the divided frame image group to an evaluation value of the divided frame image group calculated from the evaluation value of each frame image, with a third publishing threshold value set according to the priority of publishing for each annotation tag scene.

9. The image processing apparatus according to claim 8, wherein in case where the priority of publishing for each annotation tag scene is higher, the third publishing threshold value is set to be smaller.

10. The image processing apparatus according to claim 3, wherein the processor sets the priority of publishing for an annotation tag scene, the processor analyzes the annotation tag scene of each frame image by annotation analysis and assigns an annotation tag corresponding to the analyzed scene to the frame image, in case where the divided frame image group is an annotation tag scene, the processor temporarily determines whether or not to publish the divided frame image group based on the priority of publishing for the annotation tag scene of the divided frame image group, the image processing apparatus further comprises:

a display unit which displays a result of the temporary determination; and an input unit which receives final determination of publishing or non-publishing input by the user with reference to the result of the temporary determination displayed on the display unit, and the processor mainly determines whether or not to publish the divided frame image group based on the final determination.

11. The image processing apparatus according to claim 3, wherein the processor calculates an evaluation value of the divided frame image group by an arithmetic mean value, a median, a mode, or a weighted mean value of all frame images included in the divided frame image group.

12. The image processing apparatus according to claim 3, wherein the processor uses only frame images, in which the evaluation value is greater than the first publishing threshold value set according to the priority of publishing for each image quality evaluation item, among frame images included in a divided frame image group determined to be published to generate the digest moving image.

13. The image processing apparatus according to claim 1, wherein the processor determines that two or more frame images, in which similar sound is consecutive are scenes with the same sound.

14. The image processing apparatus according to claim 1, wherein the processor determines that two or more frame images with different feature points are scenes with the different feature points.

15. The image processing apparatus according to claim 1, the processor further configured to perform:

setting a photographing place of the moving image, at which publishing is limited, for each of the one or more category scenes, and in case where generating one digest moving image from a plurality of moving images, the processor performs control regarding whether or not to include frame images, included in a divided frame image group determined to be published, in the digest moving image according to the photographing place of the moving image.

16. The image processing apparatus according to claim 1, wherein, each time the frame image is extracted from the moving image, the processor performs image analysis of the extracted frame image.

17. The image processing apparatus according to claim 1, wherein, in case where a person desired to be published and a person not desired to be published are taken simultaneously in the frame image included in the divided frame image group determined to be published, the processor performs mosaic processing on the face of the person not desired to be published and includes the frame image, in which the person desired to be published and the person not desired to be published are taken simultaneously, in the digest moving image.

18. An image processing method comprising:

a step in which a frame image extraction unit extracts a plurality of frame images from a moving image;

a step in which an image analysis unit performs image analysis of each frame image to determine a scene of each frame image;

a step in which a frame image division unit divides the plurality of frame images into one or more divided frame image groups according to a replay order of the moving image while taking one frame image different from the scenes of preceding and following frame images in the replay order of the moving image, or two or more frame images, in which the same scene is consecutive, as a divided frame image group on the scene of each frame image;

a step in which a publishing/non-publishing determination unit determines whether or not to publish each divided frame image group based on the priority of publishing for a scene of the divided frame image group;

a step in which a digest moving image generation unit combines a part or all of frame images included in the divided frame image group determined to be published to generate a digest moving image of the moving image; and a step in which a publishing range setting unit sets a range of users to be published for each of the one or more category scenes, wherein the publishing/non-publishing determination unit determines whether or not to publish each divided frame image group based on the priority of publishing for the scene of the divided frame image group for each type of the range of users to be published, and the digest moving image generation unit combines a part or all of frame images included in the divided frame image group determined to be published for each type of the range of users to be published and assigns access authority corresponding to the type of the range of users to be published to generate the digest moving image of each type of the range of users to be published.

19. A non-transitory computer-readable recording medium having a program recorded thereon, which causes a computer to execute the respective steps of the image processing method according to claim 18.

20. A moving image publishing system which publishes moving images, which are uploaded from one or more clients to a server through a network, to users of the clients through the network, wherein each of the clients includes a first transfer unit which uploads a moving image or a digest moving image generated by the image processing apparatus according to claim 1 to the server through the network, and the server includes a second transfer unit which receives the moving image or the digest moving image uploaded from the client through the network, a moving image storage unit which stores the moving image or the digest moving image received by the second transfer unit, and a publishing control unit which performs control regarding whether or not to publish the digest moving image generated from the moving image stored in the moving image storage unit by the image processing apparatus or the digest moving image stored in the moving image storage unit to the user of the client through the network.

21. A moving image publishing method which publishes moving images, which are uploaded from one or more clients to a server through a network, to users of the clients through the network, the moving image publishing method comprising:

in each of the clients, a step in which a first transfer unit uploads a moving image or a digest moving image generated by the image processing method according to claim 18 to the server through the network;

in the server, a step in which a second transfer unit receives the moving image or the digest moving image uploaded from the clients through the network;

a step in which a moving image storage unit stores the moving image or the digest moving image received by the second transfer unit; and a step in which a publishing control unit performs control regarding whether or not to publish a digest moving image generated from the moving image stored in the moving image storage unit by the image processing method or the digest moving image stored in the moving image storage unit to the user of the client through the network.

22. A non-transitory computer-readable recording medium having a program recorded thereon, which causes a computer to execute the respective steps of the moving image publishing method according to claim 21.

* * * * *